United States Patent [19]

Czernakowski

[11] 4,090,735
[45] May 23, 1978

[54] SAFETY HARNESS FOR EARTHMOVING EQUIPMENT

[75] Inventor: Waldemar Czernakowski, Blaustein, Germany

[73] Assignee: Romer-Wingard Autogurte GmbH, Blaubeurer, Germany

[21] Appl. No.: 634,151

[22] Filed: Nov. 21, 1975

[30] Foreign Application Priority Data

May 28, 1975 Germany ............................ 2525144

[51] Int. Cl.² .............................................. A62B 35/00
[52] U.S. Cl. ................................................... 297/388
[58] Field of Search ............... 297/216, 388, 389, 385; 244/122 B; 280/744, 747; 242/107.4 R

[56] References Cited

U.S. PATENT DOCUMENTS

| | | | |
|---|---|---|---|
| 2,650,655 | 9/1953 | Neahr et al. | 244/122 B |
| 2,701,693 | 2/1955 | Nordmark et al. | 297/216 X |
| 2,708,966 | 5/1955 | Davis | 244/122 B |
| 2,825,581 | 3/1958 | Knight | 242/107.4 |
| 3,077,324 | 2/1963 | Strickland, Jr. | 244/122 B |
| 3,620,569 | 11/1971 | Mathis | 280/747 X |

*Primary Examiner*—James T. McCall
*Attorney, Agent, or Firm*—Diller, Brown, Ramik & Wight

[57] ABSTRACT

A safety harness to restrain the operator of an earthmoving vehicle. The harness includes a pelvis belt connected to respective shoulder belts, each end of the pelvis belt and the shoulder belts are connected to belt retractors lockable by means responsive to both belt speed and the inclination of a vehicle. The vehicle inclination response of each retractor is similar, so that they act simultaneously, and a device is provided for adjusting the vehicle inclination response independently of the belt speed response to give the operator freedom of movement with safety restraint. The device may be coupled by cables to respective levers for locking the retractors, disabling the vehicle inclination response or for making the vehicle inclination response effective or by a double-acting solenoid having an armature for achieving the same effect.

3 Claims, 3 Drawing Figures

SAFETY HARNESS FOR EARTHMOVING EQUIPMENT

FIELD OF INVENTION

This invention relates to a safety harness for an operator in the cabin of an earthworking machine.

Earthworking machines, particularly machines used in quarrying, usually move over difficult, frequently steep and dangerous terrain which frequently changes steeply sloping positions of the machine. Moreover, the travelling and working manoeuvres to be executed by such machines are difficult, for example, about half the total distance travelled by such machines is in reverse gear. As a result, these machines require very precise steering by the driver if satisfactory work is to be performed and dangerous collisions, or even overturning of the machine on steep inclines, are to be avoided. However, the driver must be able to obtain a clear view of the terrain from his cabin in order to assess the situation. He cannot do this from the driver's seat only. Considerable freedom of movement in the cabin is required so that he can not only lean forward and wriggle about whilst sitting on his seat but can also stand up from the seat while the machine is travelling and, for example, lean sideways out of the cabin and, at all events, be able to steer the machine while he is standing up. Since the machine frequently changes its tilt due to the terrain, a considerable part of the operator's attention is also taken up with holding on tightly.

The freedom of movement required in the cabin has prevented effective protection of operators in the event of collision, toppling or overturning of the machine. Although cabins could be sufficiently reinforced by means of roll bars or the like to prevent crushing in the event of toppling or overturning, there has, hitherto, been a lack of suitable harnesses which ensure that an operator is held fast in such an event, particularly to prevent ejection from the cabin, but which restrict as little as possible the freedom of movement of an operator in the cabin.

DESCRIPTION OF PRIOR ART

U.S. Pat. No. 2,557,313 discloses a safety harness having a pair of shoulder belts coupled to respective belt retractors each fitted with inertia responsive means for locking a belt storage reel. The inertia responsive means of each retractor may be rendered inoperative by moving a lever but, in this condition, there is nothing to arrest the belt if the wearer of the harness is projected from a seat. Moreover, although a pelvis belt is also disclosed, this is permanently attached to the seat and does not allow the wearer of the harness the sufficient freedom of movement necessary for effectively controlling the motion of an earthworking machine. In particular, the wearer cannot stand up from the seat when the pelvis belt is fastened.

SUMMARY OF INVENTION

The invention overcomes the abovementioned problems of the prior art by providing a safety harness comprising a pelvis belt connected to respective shoulder belts. Each end of the pelvis belt and the shoulder belts are connected to retractors which are lockable by means responsive to both belt speed and the inclination of the vehicle. The vehicle inclination responsive means of each retractor has substantially the same operating characteristics whereby they respond together to the inclination of the vehicle. The retractors are coupled to a means for overriding the vehicle inclination response whereby their locking effect may be cut-in or cut-out as required. When the belt retractors are of the reel type with a ratchet wheel engaged by a movable pawl, the pawl may be free for movement in response to an inertia member or be maintained in engagement with, or disengagement from the ratchet wheel. The override means suitably includes a level for selecting these three positions. However, said device controls only the vehicle inclination response and not the belt speed response which is always effective, if for example, the inclination response is cut out. Thus, an operator of an earthworking machine can select a suitable inclination response for the prevailing terrain. If the inclination response is cut out, the belt speed response of each retractor is still effective to restrain a sudden movement in a hazardous condition. Nevertheless, the operator has complete freedom of movement in normal working conditions so that he can leave the seat to assess the terrain and the corresponding driving conditions. The shoulder belts may be connected to a further belt which is coupled to a single retractor and, in this case, the shoulder belt can form a loop which passes freely through a fitting attached to the further belt. Preferably, each of the belt retractors comprises a self-winding reel which rotates together with a ratchet wheel, a pawl or detent and a gravity displaceable member for moving said pawl or detent into engagement with said ratchet wheel. A control lever of the override means may be attached by Bowden cable to all retractors, to provide a common control. The level may be coupled to a control rod which has a pair of abutments positioned on respective sides of the pawl. Alternatively, the pawl may be coupled to the armature of an electromagnet or solenoid which is double-acting, with respect to a neutral position, to withdraw or advance the armature to maintain the pawl in engagement with, or disengagement from, the ratchet wheel.

Accordingly, it is an object of the invention to provide a safety harness for an operator of an earthworking machine which provides sufficient freedom of movement to allow the operator to leave his seat during normal working conditions, but which includes means to restrain the operator automatically in hazardous conditions.

It is a further object of the invention to provide a safety harness in which the operator can select restraint conditions according to the terrain.

These and other objects of the invention will become apparent by the following description of a preferred embodiment of the invention. The embodiment will be described with reference to the accompanying drawings, provided for the purpose of illustration only, and in which.

Figure 1:
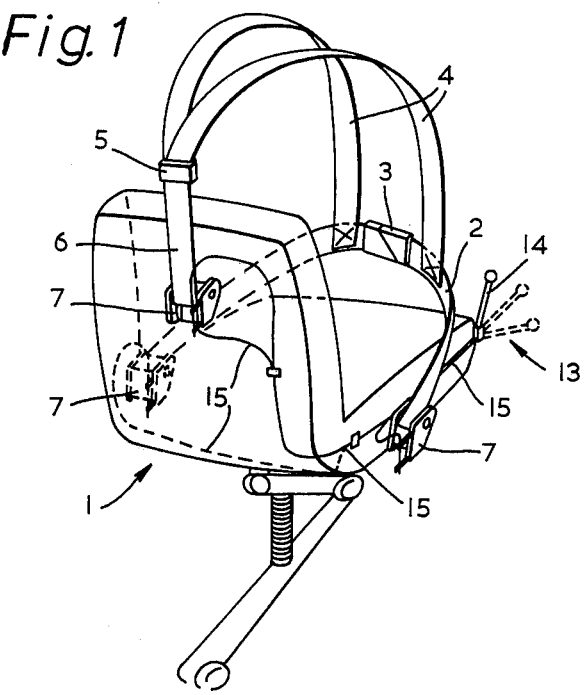
FIG. 1 is a perspective view of a safety harness according to the invention.

Referring to FIG. 1, in a vibration-free seat 1 is located in the cabin of an earthworking machine (not shown) and is fitted with a safety harness according to the invention. The safety harness comprises a pelvis belt 2 having two parts which may be joined by a buckle 3.

Two shoulder belts 4 are joined to the pelvis belt 2 and form a loop which passes freely through a metal fitting 5 secured to a further length of belt 6. Belt 6 and both ends of the pelvis belt 2 are secured to belt retractors 7, for example, self-winding reels with locking mechanisms. The locking mechanisms include a device responsive to belt speed to lock the reel and a device responsive to vehicle slope to lock the reel. The slope responsive devices have substantially the same operating characteristics so that they operate similarly with regard to the slope of the vehicle. Moreover, the vehicle slope response device is independent of the belt speed response device so that the latter can operate at all times.

Figure 2:
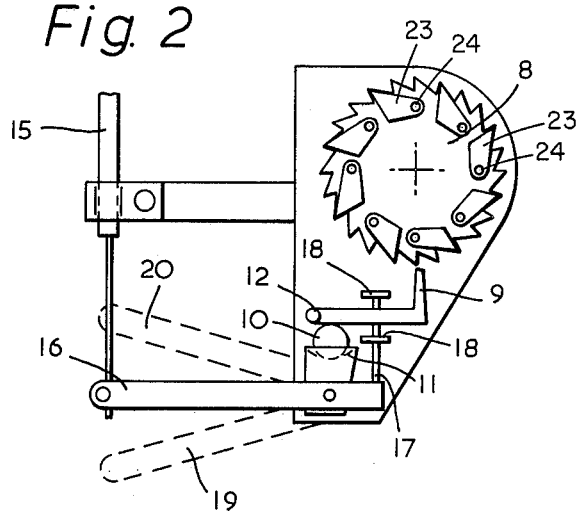
FIG. 2 is a schematic view of a belt retractor for use with the harness of FIG. 1 and showing a mechanical device for adjusting vehicle slope response.
Figure 3:
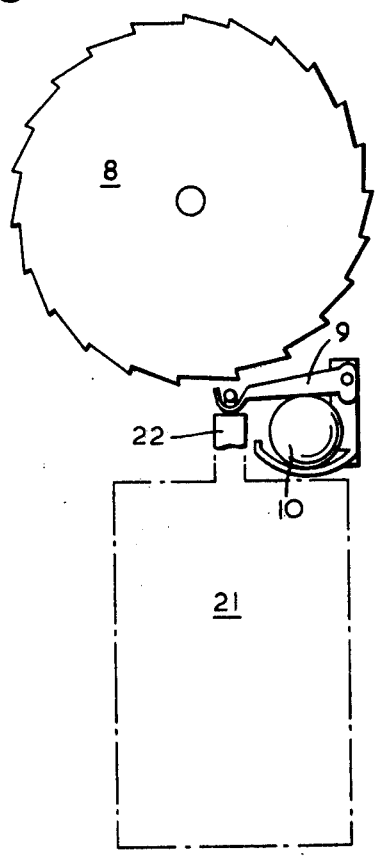
FIG. 3 is a schematic view of a ratchet wheel of a retractor such as that shown in FIG. 2 but with an electrical device for adjusting vehicle slope response.

FIG. 2 shows a belt retractor in more detail, the retractor comprising a storage spindle (not shown) which rotates with a ratchet wheel 8, a pawl or detent 9 to engage and thereby lock the ratchet wheel 8 and a gravity displaceable member 10 in the form of a ball supported in a cup 11 beneath the pawl or detent 9. The pawl or detent 9 is pivoted at 12 and is tilted by movement of the ball 10 which rolls in the cup 11 when the machine is inclined.

A known belt speed responsive device comprising, for example, means responsive to angular acceleration of the belt spindle to lock the ratchet wheel 8, is also employed in the belt retractor 7. The speed responsive device is formed in accordance with U.S. Pat. No. 3,430,891 to Burleigh, granted Mar. 4, 1969, and, as best shown in FIG. 2, includes a plurality of bob weights 7 which coincide or register with teeth of the ratchet wheel 8. The bob weights 7, when the ratchet wheel 8 is rotated at an excessive speed, swing out and engage the pawl detent 9.

FIG. 1 shows an adjusting device 13 provided with a control lever 14 for simultaneously adjusting the vehicle slope response of each retractor 7. The device 13 may be operated to prevent the detent or pawl 9, of each retractor 7, from engaging the ratchet wheel 8. This does not interfere with the operation of the belt speed responsive device. Device 13 may also be used to maintain engagement between the detent or pawl 9, of each retractor, and the ratchet wheel 8 whereby the belt remains locked.

The device has three positions for the lever 14 including a neutral position in which the pawl or detent 9 is free to move in accordance with movement of ball 10, a first position wherein the pawl or detent 9 is maintained disengaged from the ratchet wheel 8, and a second position wherein the pawl or detent 9 is maintained in engagement with the ratchet wheel 8. Selection of these positions simultaneously affects the operation of the three retractors 7.

Movement of lever 14 maybe transmitted via Bowden wires 15 which are coupled to respective levers 16. Lever 16 is pivoted adjacent the cup 11 so that its free end moves up and down due to movement of lever 14. A control rod 17 is attached to the free end and has stops 18 on either side of the pawl or detent 9. These stops abut pawl 9, when lever 16 is moved up and down, to hold the pawl either in engagement, or disengagement, with wheel 8. Levers 16 is shown in the neutral position in FIG. 2, wherein pawl 9 is freely movable by ball 10. The broken lines 19, 20 indicate positions corresponding with the first and second positions respectively of lever 14.

As an alternative to a cable controlled lever 16, an electromagnetic or solenoid 21 can be used with an armature coupled to pawl 9. The armature is sprung loaded so that it returns to a neutral position when the electromagnet or solenoid is de-energised. The electromagnet or solenoid 21 can have a pair or windings which are alternately energised to move the armature in different directions from the neutral position to which it returns under spring bias. It may also be feasible to use a single coil and a permanently magnetised armature with means for reversing the current flow in the coil to move the armature 22 in different directions. Preferably, the armature 22 is hooked onto the free end of pawl 9, e.g. on a hook shaped free end of the pawl, so as to ensure positive engagement with the teeth of the wheel 8. The electromagnet or solenoid 21 must be strong enough to hold the pawl in the disengaged or engaged positions under the most severe working conditions.

The invention is defined by the following claims:

1. A safety harness comprising a pelvis belt connected to a pair of shoulder belts, each end of the pelvis belt being coupled to a belt retractor and the shoulder belts being coupled to at least one other belt retractor, said belt retractors being lockable in response to both belt withdrawal speed and the inclination of a vehicle to which the safety harness is to be fitted, the retractors being substantially equally responsive to inclination and said retractors being coupled to a means for overriding the response of said retractors to variations in inclination, each of said belt retractors including a self-winding reel which rotates together with a ratchet wheel, each retractor also including a pawl and a gravity displaceable member, said gravity displaceable member being arranged to move said pawl into locking engagement with said ratchet wheel, and said overriding means acting on said pawl either to maintain its inoperative position, or to release it for movement by said gravity displaceable member.

2. A safety harness according to claim 1 wherein said overriding means comprises a solenoid and an armature connected to said pawl.

3. A safety harness comprising a pelvis belt connected to a pair of shoulder belts, each end of the pelvis belt being coupled to a belt retractor and the shoulder belts being coupled to at least one other belt retractor, said belt retractors being lockable in response to both belt withdrawal speed and the inclination of a vehicle to which the safety harness is to be fitted, the retractors being substantially equally responsive to inclination and said retractors being coupled to a means for overriding the response of said retractors to variations in inclination, said means for overriding including means for rendering said belt retractors nonlockable in response to vehicle inclination.

* * * * *